United States Patent [19]
Holland

[11] 4,018,633
[45] Apr. 19, 1977

[54] CRYOGENIC METAL CHIP RECLAMATION

[75] Inventor: Maxwell S. Holland, Troy, Mich.

[73] Assignee: Ford Motor Company, Dearborn, Mich.

[22] Filed: Nov. 19, 1975

[21] Appl. No.: 633,519

[52] U.S. Cl. .............................. 148/126; 75/211; 241/23; 241/DIG. 37

[51] Int. Cl.² .......................................... B22F 1/00

[58] Field of Search .................... 75/211; 148/126; 241/23, 26, 29, DIG. 37; 62/320

[56] References Cited

UNITED STATES PATENTS

| | | | |
|---|---|---|---|
| 2,892,697 | 6/1959 | Davies et al. | 241/23 |
| 3,072,347 | 1/1963 | Dombrowski | 241/3 |
| 3,363,846 | 1/1968 | Eck | 241/DIG. 37 |
| 3,666,185 | 5/1972 | Williams | 241/23 |
| 3,804,339 | 4/1974 | Laws et al. | 241/17 |
| 3,885,744 | 5/1975 | Drage | 241/23 |

FOREIGN PATENTS OR APPLICATIONS

| | | |
|---|---|---|
| 788,542 | 1/1958 | United Kingdom |

Primary Examiner—Brooks H. Hunt
Attorney, Agent, or Firm—Joseph W. Malleck; Keith L. Zerschling

[57] ABSTRACT

A method of converting scrap metal to a powder suitable for making sinterable shapes is disclosed. Scrap metal equivalent to machine turnings, is subjected to a two-cycle process which graduates the conversion of turnings to powder. The scrap metal, in the first cycle, is cooled to a temperature below the ductile-brittle transition point for said metal and fragmented by impact to a particle size of −¼ inch. In the second cycle, the fragmented pieces are again cooled to below the ductile-brittle transition point for said metal and fragmented by impact to a particle size of −¼ inch. In the second cycle, the fragmented pieces are again cooled to below the ductile-brittle transition temperature and comminuted to a fine powder of −30 mesh. During each cycle, a cryogenic cooling medium is injected into the metal collection both at the entrance to fragmenting or comminuting apparatus as well as into a circulating mass of the metal within the apparatus. Screens are employed to classify the output of each apparatus and each have screen openings shaped to maximize through-put.

The resultant converted powder is subjected to annealing, powder blending, compaction, and sintering to provide a sintered shape.

18 Claims, 2 Drawing Figures

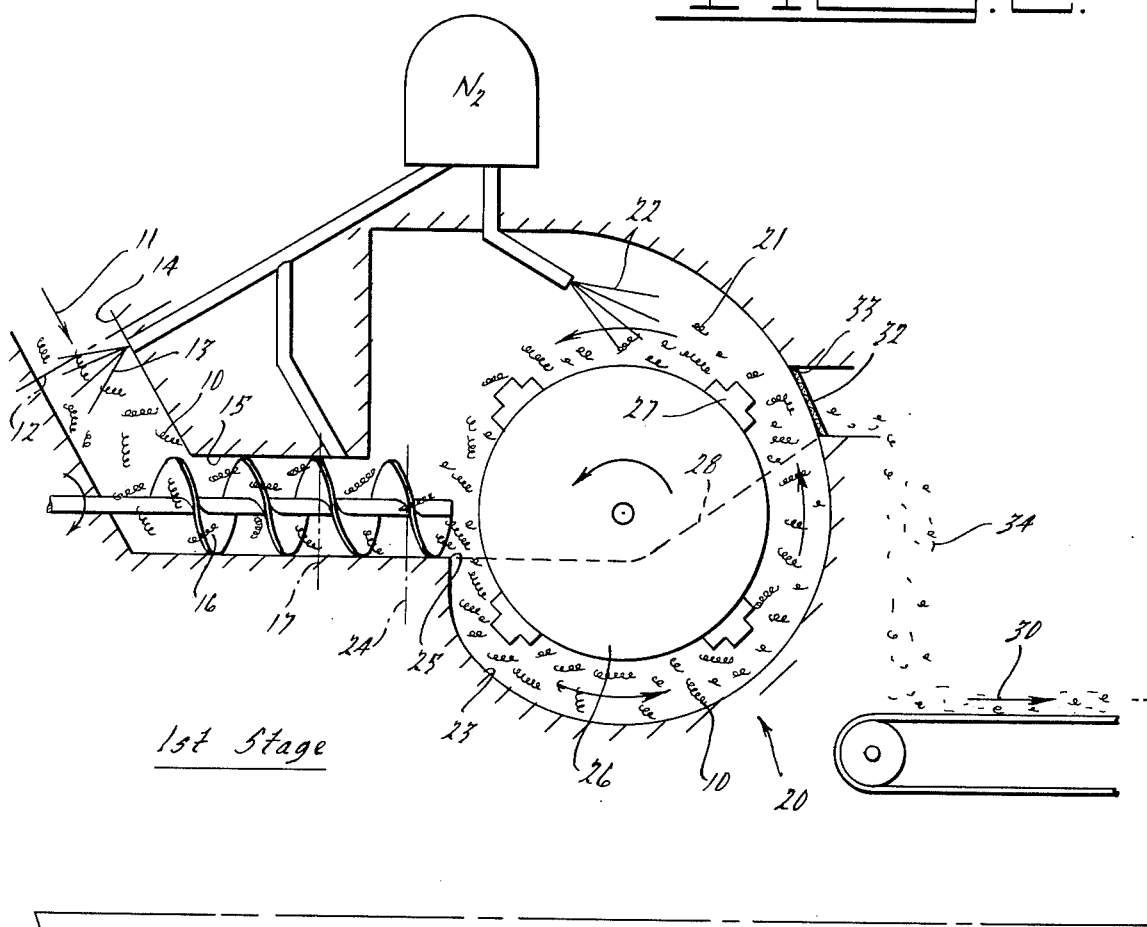
FIG. 2.
1st Stage
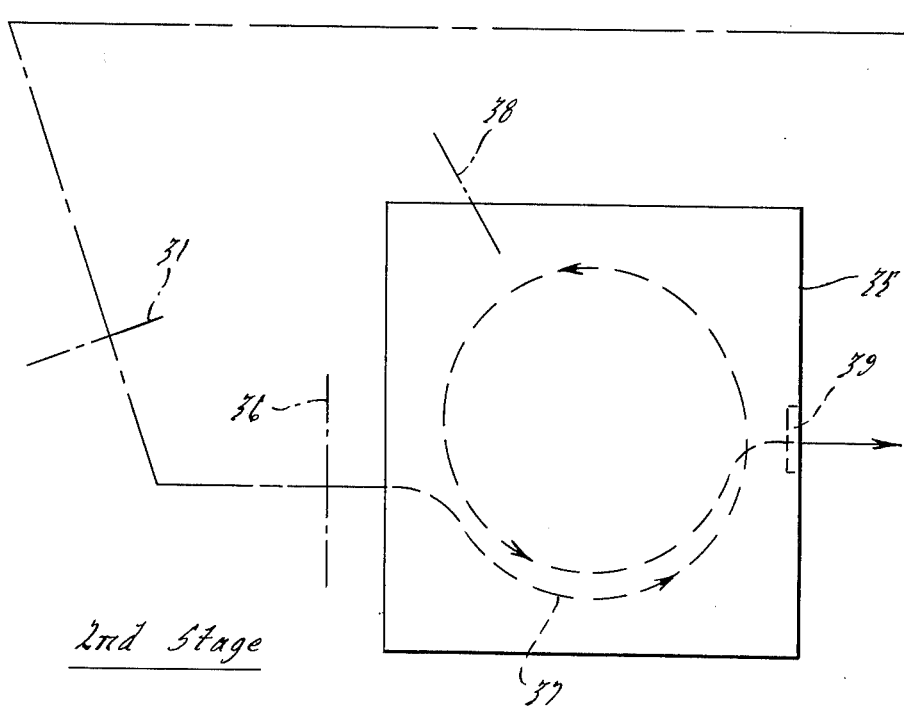
2nd Stage

CRYOGENIC METAL CHIP RECLAMATION

BACKGROUND OF THE INVENTION

Impacting of metal which has been cooled below its ductile-brittle transition temperature has been visualized by the prior art as a means to produce metal powder. One of the first methods of the prior art was to precondition the metal by collecting the scrap in bales and immersing the bales in liquid nitrogen. This first method and others to date implementing this concept have not been completely successful. It has been found particularly difficult to comminute metal to a uniform powder product having a particle size of less than −30 mesh. It is difficult to achieve this type of product, starting with metal scrap of a size greater than ½ inch as its smallest transverse dimension, because repeated impacting, necessary to properly fragment the starting material contributes heat energy causing at least local portions of the pieces to become ductile. It has been found most difficult to maintain a temperature in the range of −95° to −110° F for mild carbon steel since the metal elements (milling elements) producing fragmentation impart considerable chloric heat content to the metal pieces being fragmented; the pieces also are exposed to non-supercooled portions of the milling chamber for momentary periods.

It has also been difficult to cryogenically process the metal scrap so that it would have satisfactory compressibility in the powder form when employing the powder in conventional metallurgy techniques.

SUMMARY OF THE INVENTION

A primary object of this invention is to provide a method for producing from scrap metal, a uniformly sized metal powder which has improved sintering and compressibility characteristics; the scrap metal employed is particularly machine turnings and the process utilizes a cryogenic technique which reduces the scrap metal temperature to below its ductile-brittle transition temperature.

Another object of this invention is to provide a method for consistently maintaining the temperature of scrap metal during a comminuting operation below its ductile-brittle transition temperature both prior to and during impacting and fragmentizing.

Yet still another object of this invention is to provide a process, utilizing a cryogenic step therein, for making a powder from scrap metal, said powdered product having a uniformly distributed oil coating about each powder particle acting as an anti-oxidation agent, said oil being present as an impurity in said scrap metal and carried through the process.

Particular features pursuant to the above objects comprise: (a) the development of a recirculating slurry consisting of scrap metal and liquid nitrogen, the slurry being repeatedly impacted for a predetermined period of time and frequency to obtain the powder, (b) impaction is carried out in two separate and independent stages, the second stage to substantially produce particles less than 10% the size of the particles resulting from the first stage, (c) the starting material is classified to have a surface/volume ratio of at least 60:1, and (d) the volume usage of liquid nitrogen is regulated to be about 0.8 lbs. for each lb. of ferrous based metal processed.

FIG. 2 is a pictorial schematic illustration of certain steps of the process illustrated in FIG. 1.

DETAILED SPECIFICATION

Figure 1:
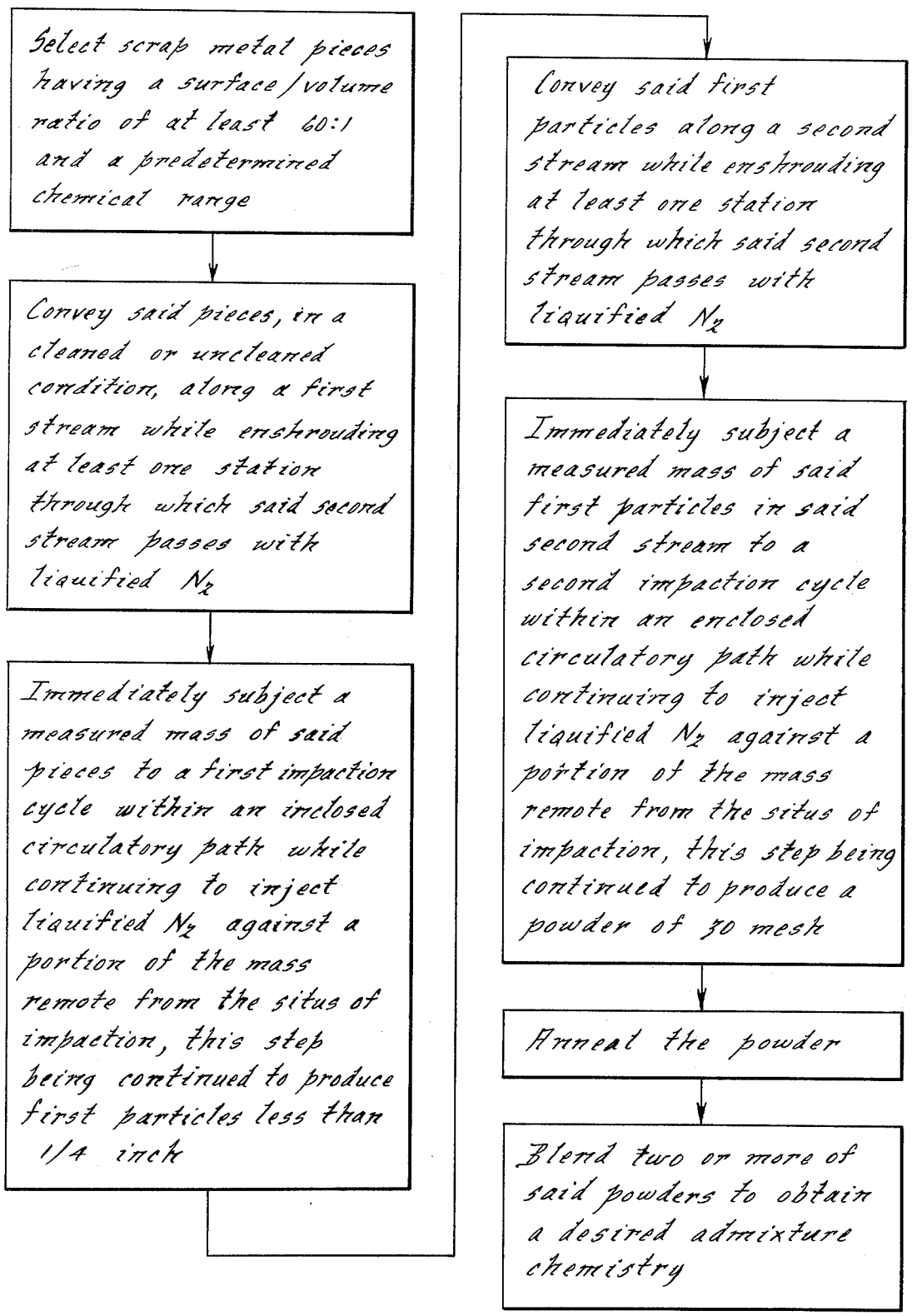
FIG. 1 is a flow diagram of the process steps of the invention.

A preferred mode for carrying out the method aspects of this invention is schematically illustrated in FIG. 1 and is as follows:

1. Scrap metal and particularly machine turnings is selected as starting material. "Machine turnings" is defined herein to mean segments of ribbons of plain carbon or low alloy steel. They typically are shaved or cut from bar; ferrous based turnings usually include alloying ingredients such as manganese, silicon, chromium, nickel or molybdenum. The turnings should be selected to have a surface-to-volume ratio of at least 60:1 which is characteristic of machine turnings. The scrap pieces utilized as the starting material within the broad operability of this invention, may include any variety of metal, including carbon steels. Scrap pieces typically will have a size characterized by a width of 0.1–1.0 inches, a thickness of about 0.005–0.05 inches, and a length of 0.25–100 inches. Machine turnings are usually not suitable for melting in an electric furnace because they prevent efficient melt down due to their large surface-to-volume ratio.

This process can be performed with other types and larger pieces of scrap metal, although capital investment costs may increase due to the difficulty of impacting scrap metal sized in particle pieces beyond 0.05 inches thick. The scrap pieces should be generally compatible in chemistry as designed for the final product; this is achieved optimally when the scrap is selected from a common machine operation with the same metal stock utilized in forming the turnings.

The preferred chemistry for the starting materials, when comprised of ferrous based alloy scrap material, is such that it contains an element selected from the group consisting of chromium, molybdenum, manganese, nickel, each element selected being no greater than 4% and other alloying ingredients being present in a total amount no greater than 2%.

2. The metal pieces 10 are conveyed, in a clean or uncleaned condition, along a first stream 11 while shrouding at least one station 12 through which said stream passes with a liquid cryogenic medium 13. The stream is best identified as the body of collected pieces passing through the shute 14 in communication with the horizontal channel 15. The pieces will fall principally by gravity down the inclined shute to the horizontal section. The stream is mechanically urged along its path in the horizontal channel 15 by an auger 16 having a screw action to advance the metal pieces. Another section or zone, identified at 17, is injected with liquid nitrogen which meets the scrap metal just before it enters the impacting mill 20. The spray pattern of the liquid nitrogen is effective to mingle with a number of the pieces which upon contact will instantaneously be converted to a temperature substantially below the ductile-brittle transition temperature of the metal piece. Some heat is introduced to the pieces by conduction through the auger and the channel walls and therefore the volume flow of the liquid nitrogen must be sufficient to compensate for such losses in the feeding channels. A weight ratio of 0.4 lbs. of liquid nitrogen for each lb. of the metal pieces passed through said stream has been determined imperically to be necessary to insure maintaining the super cool condition. The pieces will have an entrance temperature at the mouth of the impacting apparatus of about −320° F. (For ferrous based materials the ductile-brittle transition temperature is about −40° F or −40° Celsius.)

Although not necessary to this invention, it may be possible for some operators to perform a centrifuging operation or vapor degreasing to respectively remove all but about 2% or 0.1% of the cutting oil fluids clinging to the surface of said metallic scrap pieces as a result of the machining operations. In fact it is desirable, as a feature of this invention, to retain this oil.

3. The cryogenically cooled metal pieces 10 are then conveyed along a circulatory path 21 in a slurry formed with additional liquid cryogenic medium at location 22. To provide for circulation, a typical rotary cutting or milling apparatus may be employed having a cylindrical interior chamber 23. The scrap metal is urged to enter at a station 24 which has a shelf 25 with a relatively strong straight edge thereacross. A number of wheels 26 carrying cutting or fragmenting elements 27 on the outer periphery thereof are urged to swing past such shelf or edge causing the metal pieces caught between the cutting element and the straight edge to be impacted and fragmented, provided they are in a brittle condition. Alternatively, a hammer mill may be employed which carries the scrap metal along a circulatory path, portions of the path are confined by liners which narrow the spacing with the hammer elements allowing impaction to take place under continuous flowing operation. The metal pieces are stimulated to follow a circulatory path as indicated by the arrows 21. Additional liquid nitrogen is added at station 22 in such a manner as to be directed against the volume of metal pieces at a remote station from the cutting elements. The liquid nitrogen will migrate along with the metal pieces but a slurry will exist with a general liquid level as indicated at 28. The slurry consists of the metal pieces, fragmented segments thereof and liquid nitrogen.

4. The cryogenically cooled pieces in said circulatory path 21 are then repeatedly impacted while in said slurry with a sufficient force and a frequency to fragment and comminute said pieces into a supply of particles having a first predetermined size, preferably −¼ inch. The liquid nitrogen is introduced at the remote station 22 to effect a constant metal temperature for the metal pieces in the slurry between −95° and −110° F when relatively low through-puts are desired. However, when higher through-puts are important, lower metal temperatures are required in the range of −200° to −275° F when in the mill. To obtain higher through-put rates, the mill should be operated at a speed of around 4000–6000 rpm, assuming a 20 horsepower mill and a liquid nitrogen supply of at least 0.4 (preferably 0.6) lbs. for each lb. of metal pieces transported. A high through-put rate will be in the range of 600–1400 lbs. per hour.

5. Next, the supply of particles are separated from said slurry and then conveyed along a second stream 30 while again shrouding at least one station 31 through which said second stream passes with a liquid cryogenic medium. The separation is typically carried out by the use of one or more screens 32 placed at the exit opening 33 of the mill. For the first stage of impaction, a screen having −¼ inch mesh is employed. It is critical to arrange these screens so that a controlled degree of overflow of the slurry may take place through said screen allowing not only a portion of the liquid nitrogen to exit from said mill but also allowing those particles 34 which have reached −¼ inch to be separated. The liquid nitrogen is easily removed from the extracted ¼ inch metal particles by either evaporation or by suspension.

It is within the concept of this invention that the particles from step (4) not be separated from the slurry, but the slurry be directly conveyed to another mill or cycle through an insulated passage. This conserves liquid nitrogen and would lower the consumption figures indicated hereafter.

The separated particles 34 are introduced to a second horizontal channel which again leads into an apparatus 35 similar to that used for steps (3) and (4). Again liquid nitrogen is sprayed onto the advancing pieces at a section 36 close to the mouth of the interior chamber of the mill. Again the entrance temperature for said ¼ inch metal particles will be in the range of −320° F–275° F.

The amount of liquid nitrogen required to cool said finer particles 34 is typically in the range of 0.4–1.8 lbs. for each lb. of metal pieces passing therethrough.

6. The super cooled −¼ inch particles 34 are then conveyed along a second circulatory path 37 and in a slurry formed by again additional introduction of liquid cryogenic medium at station 38. This is simply a repeat of step 4 except that a slightly modified mill may be employed with different impacting elements to compensate for the smaller size of the material being introduced to the mill. A typical milling machine useful for the second stage is that of a hammer mill characterized by impacting elements which impact the particles against a liner wall.

7. The −¼ mesh particles in said circulatory path are then repeatedly impacted for a sufficient time and at a sufficient frequency to fragment and comminute said particles to a second predetermined powder size, having a size no greater than 10% of the size of the first predetermined material size. A controlled amount (between 50–90%) of the −¼ inch mesh chips or particles are reduced preferably to −30 mesh. Liquid nitrogen is introduced to the interior of the mill and again at a station remote from the hammer (station 35) at a rate of about 0.6 lbs. for each lb. of metal pieces being processed. This effects a constant metal temperature within the mill of −100° F or colder. For higher through-puts, an increased volume of liquid nitrogen can be employed compensating the metal temperature.

The second stage mill has a classifying system in the form of screens 39 which will permit typically ⅛ inch to −30 mesh (preferably only −30 mesh) particles to exit therefrom. It is most critical to this phase of the process that openings of the screens be shaped to facilitate high or maximized through-puts. It has been found imperically that a V-shaped opening, made possible by the use of a herring-bone type of screen, shows definite increases in through-put at lower cryogenic temperatures.

The hammer or impacting elements useful in this second stage as well as in the first stage, can be constructed of a material which is not necessarily brittle at the low cryogenic temperatures. This is true, for example, of comparible impacting elements which do not enter the ductile-brittle transition temperature change experienced by ferrous-based materials.

It is also within the scope of this invention to employ additional impacting cycles to effect even greater comminution, the cycles being repetitive with respect to stream definition, circulation, cooling and impaction.

8. The −30 mesh powder material separated from the processing of stage 7, is given an annealing treatment sufficient to recrystallize the structure and soften to a hardness where it is easily compressible under conventional powder compaction processes, and improves sinterability.

9. The annealed powders may then be blended by taking powders from separate processing runs utilizing different starting materials having slightly different chemistry characteristics. Thus knowing the chemistry in the different annealed powders, and knowing the predetermined chemistry to be achieved in an admixture, a proper blend can be made which is useful in typical powder metallurgical techniques.

10. Finally, the blended or unblended annealed powder is subjected to typical powder metallurgy techniques whereby a predetermined amount of powder is compacted by a conventional press to a density preferably greater than 6.4 grams/cc. requiring application of forces in the range of 25–40 psi. The sintering treatment to which the compact is subjected is typically in the range of 2000°–2400° F for ferrous-based cryogenic powder. The sintering temperature should be at least to the plastic region for the metal constituting the powder. A controlled protective atmosphere is typically maintained in the furnace which consists of an inert or reducing gas. The resulting sintered product will have strength characteristics comparable to that of powder metal in the same chemistry range but processed from molten metal.

I claim:

1. A method of making a metal powder suitable for use as a sinterable powder, the method comprising:
   a. selecting and conveying a charge of metal pieces along a continuous stream, said pieces having a transverse dimension no greater than ½ inch,
   b. injecting and directing a liquified cryogenic cooling medium, said medium being normally gaseous at ambient temperature conditions, against at least one section of said stream in sufficient amount to reduce the temperature of all the scrap pieces passing through said section to a temperature below the ductile-brittle transition temperature of the metal pieces,
   c. immediately conveying the super cooled metal pieces into a circulatory path and repetitively bringing a series of impacting elements against said super cooled pieces causing said pieces to fragment into particles and
   d. during said impaction of step (c) injecting a liquid cryogenic cooling medium into said path to insure said pieces and fragmented particles remain below said ductile-brittle transition temperature during any number of circulations in said path.

2. A method of making metal powder as in claim 1, in which the metal pieces in said circulatory path are given a preliminary impacting treatment while below said ductile-brittle transition temperature whereby the fragmented particles are reduced to a first predetermined particle size and then are given an independent impacting treatment in a circulatory path to reduce said particles to a second and smaller predetermined particle size.

3. The method as in claim 1, in which said impacting is carried out in a hammer mill and liquid nitrogen is employed as the liquified cryogenic cooling medium supplied at a rate of about 0.8 lbs.N₂ for each lb. of circulating metal pieces.

4. The method as in claim 1, in which the resulting powder formed by said method is controlled to pass through a −30 mesh by regulating the force, frequency and period of repetitive impaction.

5. The method as in claim 1, in which said comminuted particles are further subjected to an annealing operation.

6. The method as in claim 1, in which said starting scrap material is comprised of alloy scrap material having a chemistry characterized by an element selected from the group consisting of chromium, molybdenum, manganese, nickel, each element being no greater than 4% and other alloying ingredients being present in a total amount no greater than 2%.

7. A method of making a metal powder suitable for use as a sinterable powder, the method comprising:
   a. selecting scrap metal pieces having a surface/volume ratio of at least 60:1 and a predetermined chemical range,
   b. conveying said pieces, in a cleaned or uncleaned condition, along a first stream while shrouding at least one station through which said first stream passes with a liquid cryogenic medium,
   c. conveying said cryogenically cooled pieces along a first circulatory path in a slurry formed with additional liquid cryogenic medium,
   d. repeatedly impacting said pieces in said slurry with a sufficient force and frequency to fragment and comminute said pieces into a supply of particles having a first predetermined size,
   e. separating said supply of particles from said slurry and thence conveying said supply of particles along a second stream while shrouding at least one station through which said second stream passes with a liquid cryogenic medium,
   f. conveying said second stream particles along the second circulatory path in the form of a slurry provided by additional introduction of liquid cryogenic medium, and
   g. repeatedly impacting said pieces in said second circulatory slurry with sufficient force and frequency to fragment and comminute said pieces into a powder supply having a second predetermined size no greater than 10% of said first predetermined size, said second predetermined size being achieved by at least 90% of the pieces exiting from said second circulatory slurry.

8. A method as in claim 7, in which the first predetermined size is less than ¼ inch and said second predetermined size is −30 mesh.

9. The method as in claim 7, in which said pieces are cooled to a temperature in each of said circulatory paths below the ductile-brittle transition temperature for said selected metal pieces.

10. The method as in clam 7, in which said metal pieces are ferrous based and the temperature to which they are reduced in said circulatory paths is in the range of −100° to −275° F.

11. The method as in claim 7, in which said repeated impacting is carried out in a grinding mill having hammer elements which are of a material effective not to become brittle at the temperatures under which said impacting is carried out.

12. The method as in claim 7, in which foreign matter is magnetically or pneumatically separated from said first predetermined particle size.

13. The method as in claim 7, in which said liquid cryogenic medium is liquid nitrogen.

14. The method as in claim 13, in which said liquid nitrogen is introduced at a rate of about 0.8 lbs. per lb. of metal pieces in said circulatory paths.

15. A method of making a metal powder suitable for use as a sinterable powder, the method comprising:
   a. selecting scrap metal pieces having a surface/volume ratio of at least 60:1 and a predetermined chemical range,
   b. conveying said pieces, in a cleaned or uncleaned condition, along a first stream while shrouding at least one station through which said first stream passes with a liquid cryogenic medium,
   c. conveying said cryogenically cooled pieces along a first circulatory path in a slurry formed with additional liquid cryogenic medium,
   d. repeatedly impacting said pieces in said slurry with a sufficient force and frequency to fragment and comminute said pieces into a supply of particles having a first predetermined size,
   e. separating said supply of particles from said slurry and thence conveying said supply of particles along a second stream while shrouding at least one station through which said second stream passes with a liquid cryogenic medium,
   f. conveying said second stream particles along the second circulatory path in the form of a slurry provided by additional introduction of a liquid cryogenic medium,
   g. repeatedly impacting said pieces in said second circulatory slurry with sufficient force and frequency to fragment and comminute said pieces into a powder supply having a second predetermined size no greater than 10% of said first predetermined size, said second predetermined size being achieved by at least 90% of the pieces exiting from said second circulatory slurry,
   h. annealing said second predetermined powder, and
   i. blending two or more of said annealled second predetermined powders, each having differing predetermined chemistry ranges in order to obtain a desired master powder chemistry.

16. A method of producing powder metal, comprising:
   a. selecting a charge of metal scrap pieces each carrying machining oil resulting from cutting operations and conveying said scrap pieces along a stream,
   b. injecting a liquified cooling medium against a section of said stream so as to contact the pieces at a substantial number of points whereby substantially all of the scrap pieces will be reduced in temperature below their ductile-brittle transition temperature,
   c. immediately conveying the super cooled scrap pieces into a circulatory path within a chamber and wherein a series of impacting elements are repetitively brought against said scrap metal pieces and frozen oil to produce a composite homogeneous mixture of metal powder particles and fragmented frozen oil particles, during said impacting step a liquid cryogenic cooling medium is injected against said scrap pieces at a point of said circulatory path remote from said impacting elements to insure that the metal scrap and frozen oil retain their super cooled condition throughout repetitive impacting, and
   d. permitting said composite mixture to be elevated to ambient temperature conditions whereby each comminuted frozen oil particle forms a liquid coating along each of the several adjacent metal particles.

17. The method as in claim 16, in which the product of impaction is classified by one or more screens having a mesh no smaller than 1/16 of an inch.

18. The method as in claim 17, in which said screen has a herring-bone pattern of wires constituting said screen construction.

* * * * *